No. 818,189. PATENTED APR. 17, 1906.
H. M. PETTIT.
THEATRICAL DEVICE.
APPLICATION FILED FEB. 27, 1905.

WITNESSES:

INVENTOR
Harry M. Pettit
BY
ATTORNEYS

No. 818,189. PATENTED APR. 17, 1906.
H. M. PETTIT.
THEATRICAL DEVICE.
APPLICATION FILED FEB. 27, 1905.

WITNESSES:

INVENTOR
Harry M. Pettit
BY
ATTORNEYS

UNITED STATES PATENT OFFICE.

HARRY M. PETTIT, OF NEW YORK, N. Y.

THEATRICAL DEVICE.

No. 818,189.     Specification of Letters Patent.     Patented April 17, 1906.

Application filed February 27, 1905. Serial No. 247,515.

*To all whom it may concern:*

Be it known that I, HARRY M. PETTIT, a citizen of the United States, and a resident of the city of New York, borough of Manhattan, in the county and State of New York, have invented a new and Improved Theatrical Device, of which the following is a full, clear, and exact description.

My invention relates to stage apparatus for theaters and amusement places of various kinds for producing illusory effects, and in particular for giving to passengers in an automobile or other vehicle the effect of flying through the air from a height across a chasm.

In carrying out my invention I provide an automobile or other vehicle with wings and with means for spreading and vibrating the wings to give the desired effect, and also I provide means for propelling the automobile along a way or track and for supporting it when removed from the way or track, so that it may give an appearance of leaping from a cliff to a track located on the opposite side of the chasm and at a lower level. Furthermore, I provide safety devices for insuring the performance of this act in a perfectly safe manner without any danger to the occupants of the vehicle.

The invention comprises other features, which will appear in the course of the subjoined description.

Reference is to be had to the accompanying drawings, forming a part of this specification, in which similar characters of reference indicate corresponding parts in all the figures.

Figure 1 is a bottom plan view of an automobile constructed in accordance with the principle of my invention.

Figure 2:
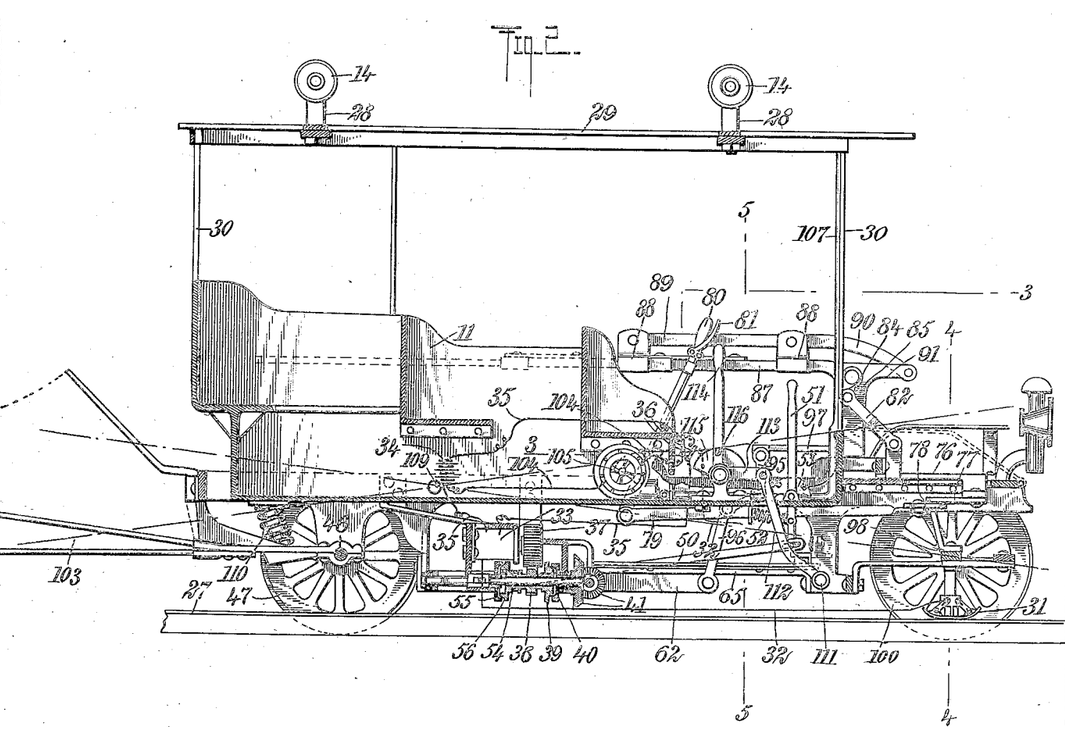
Fig. 2 is a sectional view of the same on the line 2 2 of Fig. 1.
Figure 3:
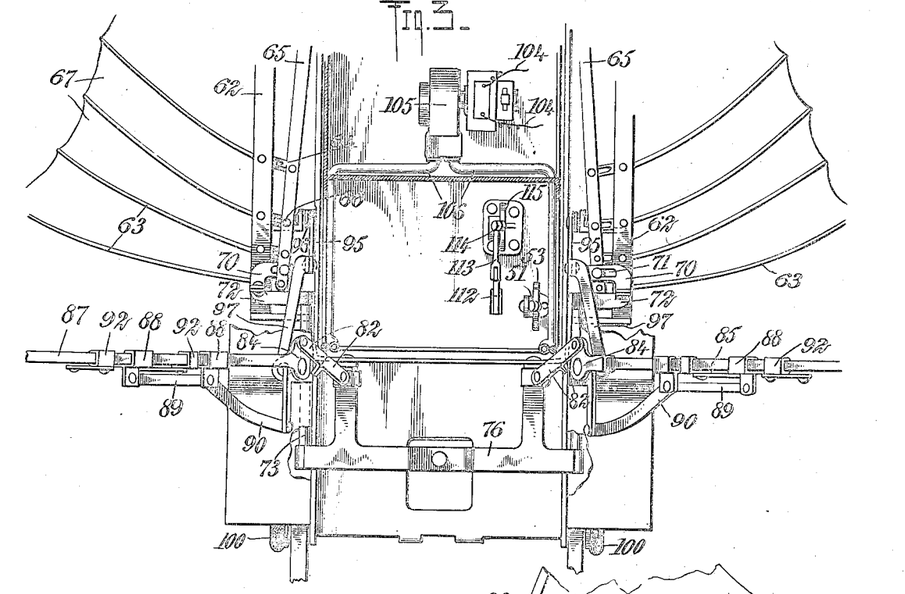
Fig. 3 is a horizontal sectional view on the line 3 3 of Fig. 2.
Figure 4:
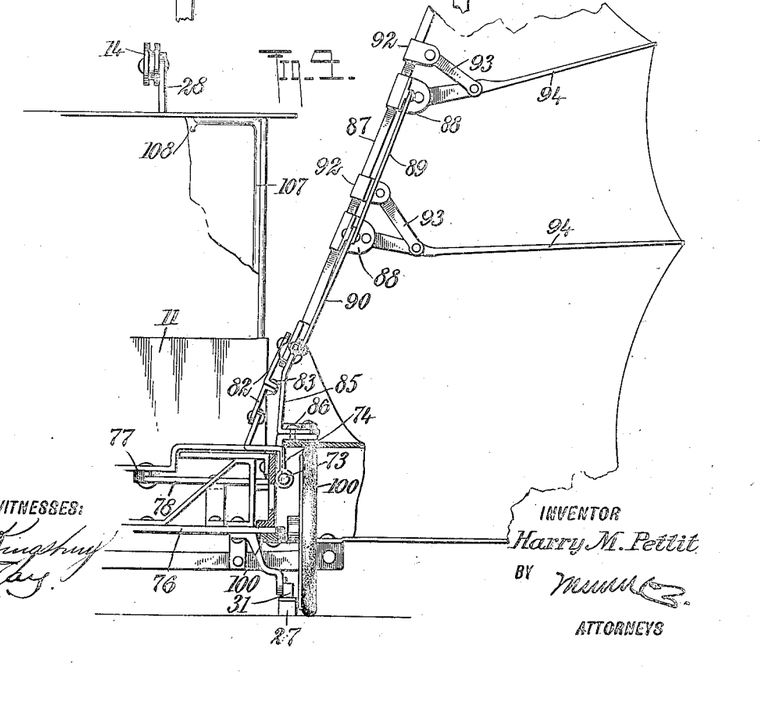
Figs. 4 and 5 are vertical sectional views on the lines 4 4 and 5 5, respectively, of Fig. 2.
Figure 5:
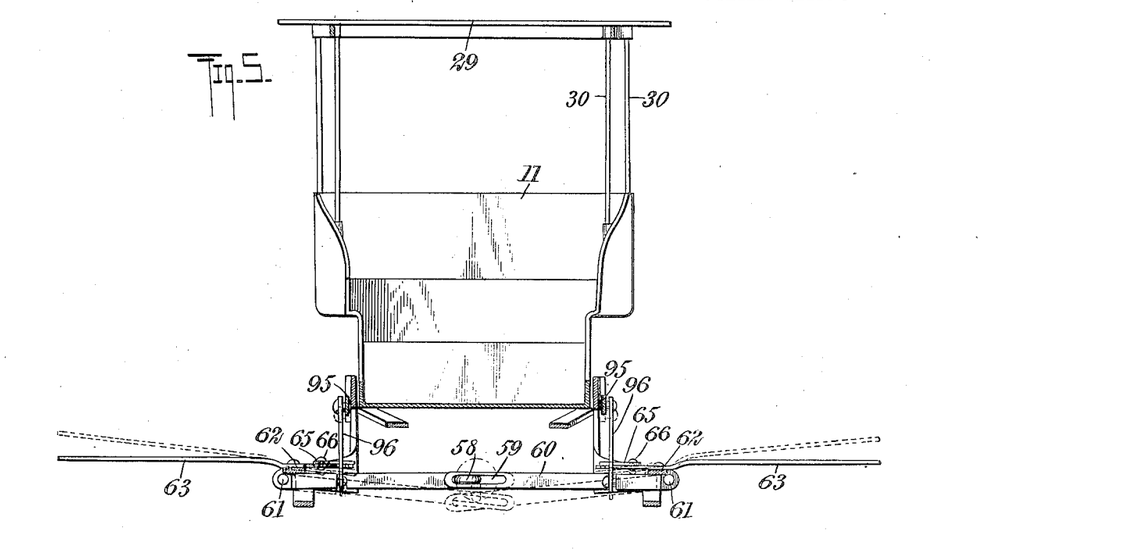
Figure 6:
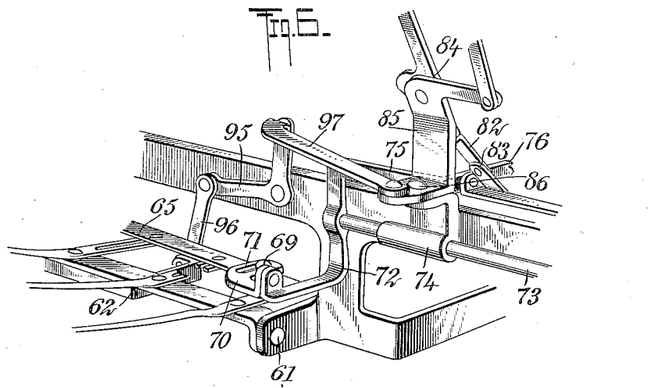
Fig. 6 is a perspective view of a portion of the mechanism for operating the wings.
Figures 7, 8, 9, 10, 11:
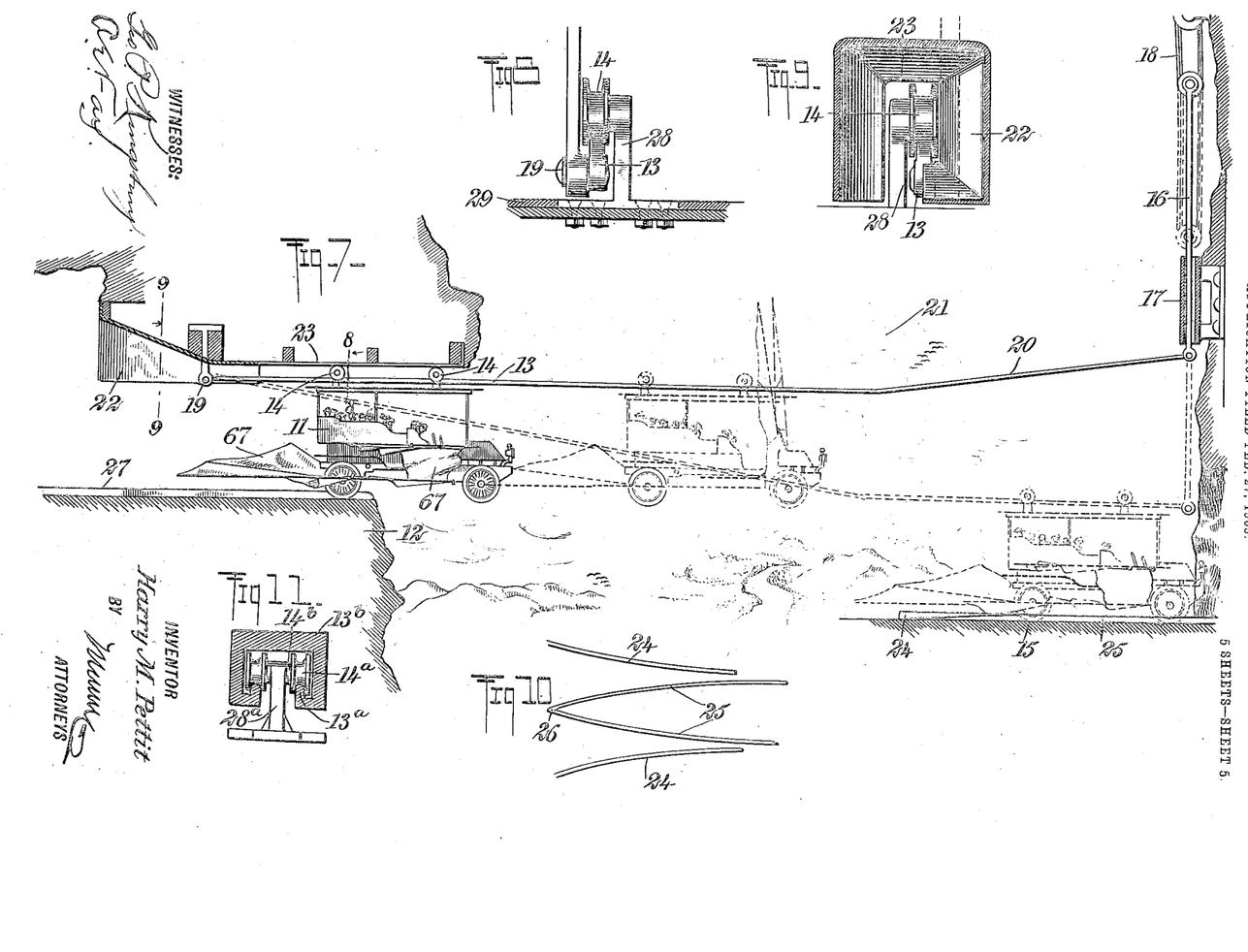
Fig. 7 is a sectional view of a portion of a stage, showing one manner of controlling the operation of the vehicle and illustrating the scenery and course of flight of the automobile.
Figs. 8 and 9 are sectional views, on an enlarged scale, on the lines 8 8 and 9 9, respectively, of Fig. 7.
Fig. 10 is a plan of the track upon which the vehicle lands, showing a safety device for guiding the wheels.
Fig. 11 is a view similar to Fig. 8, showing a modification.

Referring first to Figs. 7, 8, and 9, it will be observed that an automobile 11 is designed to run along the top of a cliff 12 and when near the outer edge thereof to engage with an overhead track 13 by means of trolley-wheels 14 or the like and passing through the air beyond the cliff, land upon a stage or platform 15. The descent of the vehicle to the platform 15 is provided for by lowering the track 13 from the position shown in full lines to that shown in dotted lines. This is accomplished in any desired way—as, for example, by a supporting-bar 16, directed by stationary guides 17 and controlled by a fall and tackle 18 or the like. I have illustrated no particular means for operating the fall and tackle, as it will be readily understood that any ordinary motive power or the like can be employed for this purpose. In Fig. 11 is shown a construction in which a pair of tracks 13$^a$ on a frame 13$^b$ support a pair of trolley-wheels 14$^a$, mounted on a shaft 14$^b$, connected with a bracket 28$^a$. It will be noticed that the track 13 is pivoted at the point 19 to a stationary part of a building or the like and that it is provided with a bent portion 20, adapted to form a nearly horizontal track for the vehicle when it is lowered to the position shown in dotted lines. When the vehicle moves in the air, swinging from the track 13 to a position shown in the middle dotted position, scenery 21, which can be seen by the passengers in the vehicle, is given a downward motion, so as to give the passengers the sensation of ascending, and after this position is passed the direction of motion of the scenery is reversed and its rapidity increased so as to give the impression of moving rapidly downward. No particular means for moving the scenery is illustrated, as this feature is well known, and it can be accomplished in any of the known ways. In order to provide for effectually guiding the trolley-wheels onto the track 13, I have provided a tapering guide 22 large enough at the mouth to be sure to force the trolley-wheels into it and small enough at the end of the track 13 to force the wheels to engage the track when they reach that point. This guide extends in a substantially horizontal direction to the right in order to provide a roof 23 at a very short distance above the tops of the wheels 14, so as to keep them from jumping the track while the main wheels of the vehicle rest upon the top of the cliff. To provide for guiding the vehicle to the proper position on the platform 15, a pair of flaring guides 24 are arranged on the outside of this platform and converging toward each other. Between these guides are located a pair of rails 25. These also converge toward each other at a point 26 and may, if desired, be used for supplying electricity to the vehicle for propelling it. In the same manner tracks 27 upon the cliff 12 may be used for conducting electricity to the vehicle.

Referring now to the other figures, it will be seen that the wheels 14 are connected, by means of brackets 28, with the roof 29 of the vehicle and that from the roof the vehicle may be supported by means of vertical bars 30. For the purpose of propelling the vehicle the tracks 25 and 27 may be connected with a source of electrical energy and transmit power through shoes 31, bearing upon them, and wires 32 to a motor 33. It will of course be understood that any system of running the motor may be employed, either electrical or mechanical, and that if an electrical means is used it can be either a third rail, a battery system, or any other convenient arrangement. For a purpose to be described a battery 34 is located in the vehicle or upon the frame and connected with the motor by means of wires 35. The wires 32 and 35 are preferably connected with a switch 36, located in convenient position for control by the operator in the vehicle. The motor is provided with a gear 37 or other power-transmitting device, and this transmits motion to a gear or pinion 38, which is connected with a clutch member 39. When thrown to the right, this clutch member engages its mate 40, and thus provides for transmitting rotation to a pair of bevel-gears 41, which through a shaft 42, wheels 43 and 44, and chain 45 transmit power to a shaft 46, which is the main shaft of the vehicle and on which the driving-wheels 47 are mounted. A brake 48 is conventionally represented upon the driving-shaft. In order to control the operation of the driving mechanism, a lever 49 is connected with the clutch, and this by means of a link 50 is connected with a hand-lever 51, pivoted to the vehicle and projecting into such a position as to be within the convenient reach of the operator of the vehicle. A spring 52 is employed for normally keeping the lever in central position, where the clutch members 39 and 40 will not be in contact with each other, and a stop-segment 53, having notches, is provided for holding the lever in two extreme positions on either side of the center. The pinion 38 and the clutch member 39 are slidingly mounted on a shaft 54, which carries the clutch member 40 and also another clutch member 55. A clutch member 56, mating with the clutch member 55, is mounted rigidly with respect to the pinion 38 and clutch member 39, and it will be readily seen that when the lever 51 is swung to the position opposite that in which the clutch members 39 and 40 engage with each other the clutch members 55 and 56 will engage with each other, thus transmitting motion from the motor to a shaft 57, which is rigidly mounted with respect to the clutch member 55. This shaft is provided with a crank 58, which passes through a pair of slots 59 in a pair of levers 60. These levers are mounted on pivots 61, located upon the outer sides of the vehicle. Each of these levers is rigidly connected with a pivoted frame 62, mounted on the outside of the vehicle. It will be seen that the rotation of the shaft 57 will cause the oscillation of these levers and also the oscillation of the frames 62 about their pivots 61. Pivotally mounted upon each of the frames 62 are a series of ribs 63. These ribs extend inward toward the body of the vehicle and are provided with elongated slots 64 near their inner ends. A bar 65 is mounted longitudinally with respect to the frame 62 and is provided with a series of pins or studs 66, projecting through the slots 64. The two end ribs instead of being provided with slots are preferably provided with perforations of the same shape and size as the studs 66. It will be readily seen that the reciprocation of the bar 65 will cause the ribs 63 to oscillate upon the pivots by which they are mounted upon the frame 62 and cause them to be spread into the position shown at the top in Fig. 1 in dotted lines. Between the ribs there is preferably mounted a web 67, consisting of cloth or any desired kind of flexible material. This web constitutes the body of the wing, and it will be seen that when the ribs are spread, as indicated above, the appearance of a wing is given to the structure described. In order to add to this effect, the wing is provided with a rearwardly-extending rib 68, which is mounted in a stationary position on the body of the vehicle. It will be seen that I have thus provided for the spreading of the wing and also for the vibration or flapping of it. In order to provide for the reciprocation of the bar 65 and the consequent spreading of the wing, a stud 69 is mounted, preferably, near the front end of the bar, and a plate 70, having an elongated slot 71 for receiving the stud, is mounted on an arm 72 by means of a pivoted connection. This arm 72 is connected with a slide 73, mounted in a guide 74 on the frame of the machine, and is rigidly connected by a bar 75 with a sliding frame 76, preferably located on the front part of the vehicle. It will be apparent that the reciprocation of this frame 76 will cause the reciprocation of the arm 72, and this motion will be transmitted through the stud to the bar 65 to spread the wing. To provide for the reciprocation of the frame 76, it is connected by a link 77, lever 78, and link 79 with an operating-lever 80. This lever is pivoted to the body of the vehicle in any desired manner and is provided with any desired form of catch-operating device 81 for retaining it in its two extreme positions. It will be seen that the spreading of the two side wings is entirely within the control of this lever, while the vibration of them is within the control of the lever 51. Connected also with the frame 76 are a pair of links 82, pivotally connected together by means of a stud 83 or the like, and the end of one of these links is pivotally connected with a bell-crank 84. This bell-crank is pivoted to a plate 85, which in turn is pivotally mounted, by means of a stud 86, on a stationary part of the vehicle. From the bell-crank projects an arm 87. Upon this arm are a pair of slides 88, connected together by rods 89 and connected, by means of a link 90, with a projection 91 upon the plate 85. This link 90 is pivoted both to the projection and to the nearest slide 88. Fixedly located upon the arm 87 at a point beyond each of the slides 88 is a bracket 92. Pivotally connected with each bracket is a link 93, and pivotally connected with each slide is a rib 94, to which the other end of one of the links 93 is pivoted. It will be obvious that the sliding of the frame 76 in a rearward direction toward the frame of the vehicle will cause the arm 87 to swing about the pivot on which the bell-crank 84 is mounted, which will cause these arms to rise from a horizontal to an inclined or vertical position. It will also be seen that the same movement will cause a reciprocation of the slides 88 with respect to the arm 87 and force the ribs to assume a position more nearly at right angles to the arm than that which they have previously occupied. This results in the spreading of these front wings. It will be seen that this operation is performed simultaneously with the spreading of the side wings.

In order to provide for the oscillation of the front wings at the same time that the side wings are oscillated, a bell-crank 95, pivoted to the frame of the vehicle, is connected with the frame 62 by a link 96. The bell-crank is also connected with the plate 85 by means of a link 97. It will be readily seen that the oscillation of the frame 62, caused by the rotation of the shaft 57, will result in a vibratory motion imparted to the plate 85, and consequently to the front wing. The reason for pivoting the two links 82 together, as well as the reason for pivoting the two parts 70 and 72 to each other, will be apparent when it is considered that if these parts were rigidly mounted with respect to each other this oscillatory or flapping movement of the front wings could not be accomplished.

For guiding purposes the automobile is provided with a stationary axle 98, having extensions 99, on which the front wheels 100 are mounted. These extensions are pivoted with respect to the stationary axle, being mounted on bell-cranks 101. These two bell-cranks are connected together by a link 102. Means may be provided for operating the link so as to control the motion of the front wheels; but ordinarily this will not be desired on account of the way in which I prefer to guide the vehicle by the rails 25 and 27. These rails are preferably located upon the inside of the wheels and effectually prevent them from running in any course except that laid out by the rails. They will also guide the wheels around curves and provide for the leading of the vehicle to the tracks after the leap is made in the manner indicated in Fig. 10. A rear wing or tail 103 may be provided for the vehicle, and it will be understood that this, as well as all the wings, will be provided with a web similar to the web 67.

It will be understood that in case a third-rail system is employed using the shoes 31 no power will be communicated to the motor after the leap is commenced unless that power is transmitted through the rail 13 or 13$^a$. As very little power will be required to oscillate the wings, it is desirable for a small battery 34 to be employed, and this can be connected with the motor as soon as the necessity for propelling the vehicle is removed. This battery is also connected, by means of wires 104, to a blower 105, although it will be understood that the blower can be operated in any other desired manner. This blower is provided with a pair of discharge-pipes 106, which lead to upright pipes 107, running up the frame of the vehicle and provided with discharge-mouths 108, designed to direct a blast of air toward the passengers in order to heighten the effect of flight through the air when the leap is being made.

In order to provide for further illusory effects in the way of simulating motion up or down an incline, the body of the vehicle is mounted upon a pivot 109 and is balanced by means of strong springs 110, so that normally it assumes a level position. A shaft 111 is mounted on the stationary part of the frame and connected by a link 112 with a bell-crank 113, controlled by a lever 114 within easy reach of the operator. A segment 115 is provided with a notch 116 to keep the lever in central position and assist the springs 110 in keeping the body of the vehicle level. When it is desired to give an imitation of an upward or downward motion, this lever is oscillated to the right or left, and this will, through the operation of the bell-crank and lever 112, cause the body to be swung about its pivot and assume an inclined position.

Although in describing the several parts of the apparatus I have referred to the manner of operation, I will now briefly describe the operation of the entire device. Supposing the vehicle to be coming along the tracks 27 in the direction indicated in Fig. 7, the lever 51 will be moved from its forward position to that shown in full lines in Fig. 2. This will disconnect the clutch members 39 and 40, and consequently disconnect the motor from the propelling mechanism. At this time the wheels 14 will enter the guard 22 and be directed onto the rail 13, and as soon as the vehicle leaves the cliff 12 the operator will shift the lever 51 backward, so as to engage the clutch members 55 and 56 and at the same time will operate the lever 80 to spread all the wings. This will cause the motor if at this time connected by means of the switch 36 with the battery to operate to flap the wings or oscillate them about their pivots in the manner described above. At the same time the blower 105 can be connected by means of the same switch (which is preferably a bipolar one) and cause air to be blown toward the passengers. At the same time the scenery 21 is caused to descend and later to ascend, and all these operations tend to produce the effect of flying through the air. The vehicle being suspended from above will be capable of having a swaying motion imparted to it, which will heighten this effect. As the car approaches the bent portion 20 of the track 13 it is preferably stopped and all of these scenic effects continued as long as may be desired. Then the fall and tackle 18 is operated to lower the track 13 about its pivot 19 to the position shown in dotted lines in Fig. 7, and the vehicle will move down by gravity onto the tracks 25. The vehicle is then intended to pass around a railway of any desired character through caverns and passages and past scenery such as may be desired, and any desired means may of course be employed to return it to a position from which it can again reach the cliff and track 27.

While I have illustrated and described only one form in which my invention may be embodied, it will be understood that it is not limited thereto and that the principle of the invention may be carried out in many ways.

Having thus described my invention, I claim as new and desire to secure by Letters Patent—

1. The combination of an automobile, wings thereon, means for spreading the wings, and means for vibrating them.

2. The combination of a self-propelled vehicle, longitudinally-placed wings pivotally mounted thereon, means for spreading the wings, and means for vibrating them about their pivots.

3. The combination of a vehicle, a set of wings thereon, and means for moving the wings from a longitudinal to an inclined position and simultaneously spreading them.

4. The combination of a vehicle, a set of wings thereon, means for moving the wings from a longitudinal to an inclined position and simultaneously spreading them, and means for thereafter vibrating the wings.

5. The combination of a vehicle, a set of longitudinally-placed wings pivotally mounted thereon, a second set of wings pivoted to the vehicle, means for moving the second set of wings from a horizontal to an inclined position, and means for spreading both sets of wings.

6. The combination of a vehicle, a set of longitudinally-placed wings pivotally mounted thereon, a second set of wings pivoted to the vehicle, means for moving the second set of wings from a horizontal to an inclined position, means for spreading both sets of wings, and means for simultaneously vibrating both sets of wings.

7. The combination of a vehicle, a frame longitudinally pivoted thereto, a series of ribs pivoted to said frame, means for spreading the ribs, and means for vibrating the frame.

8. The combination of a vehicle, a frame longitudinally pivoted thereto, a series of ribs pivoted to said frame, means for spreading the ribs, and means for vibrating the frame; said means for spreading the ribs comprising a bar pivotally connected with each rib and reciprocable along the frame.

9. The combination of a vehicle, an arm pivoted thereto and adapted to assume a longitudinal position with respect to the vehicle, a series of ribs on the arm, and means for swinging the arm on its pivot and simultaneously moving the ribs.

10. The combination of a vehicle, an arm pivoted thereto and adapted to assume a longitudinal position with respect to the vehicle, a series of ribs on the arm, and means for swinging the arm on its pivot and simultaneously moving the ribs; said means comprising a slide on the arm connected with each rib, a movable frame, and means connecting the frame and slides for moving them with respect to the arm when the arm is swung upon its pivot.

11. The combination of a vehicle, an arm pivoted thereto and adapted to assume a longitudinal position with respect to the vehicle, a series of ribs on the arm, and means for swinging the arm on its pivot and simultaneously moving the ribs; said means comprising a slide on the arm connected with each rib, a movable frame, means connecting the frame and slides for moving them with respect to the arm when the arm is swung upon its pivot, a bracket fixed to the arm adjacent to each slide, and a link pivotally connected with each bracket and rib.

12. The combination of a vehicle, an arm pivoted thereto and adapted to assume a longitudinal position with respect to the vehicle, a series of ribs on the arm, means for swinging the arm on its pivot and simultaneously moving the ribs, and means for permitting the arm to receive a pivotal motion about an axis at an angle to that about which its main pivotal motion is made.

13. The combination of a vehicle with a side wing, a front wing, and means for simultaneously vibrating both of said wings.

14. The combination of a vehicle with a side wing, a front wing, and means for simultaneously vibrating both of said wings; said means comprising a pivoted frame upon which the side wing is mounted, a pivoted arm upon which the front wing is mounted, connections between said frame and arm, and means for oscillating the frame about its pivot.

15. The combination of a vehicle with a side wing, a front wing, and means for simultaneously vibrating both of said wings; said means comprising a pivoted frame upon which the side wing is mounted, a pivoted arm upon which the front wing is mounted, connections between said frame and arm, and means for oscillating the frame about its pivot; said last-named means comprising a lever rigidly mounted with respect to said frame and having an elongated slot, a rotatable shaft having a crank entering said slot, and means for rotating the shaft.

16. The combination of a vehicle with a side wing, a front wing, and means for simultaneously vibrating both of said wings; said means comprising a pivoted lever having an elongated slot, a shaft having a crank entering said slot, a motor for rotating said shaft, and a clutch between the motor and shaft.

17. The combination of a vehicle with a side wing, a front wing, and means for simultaneously vibrating both of said wings; said means comprising a pivoted lever having an elongated slot, a shaft having a crank entering said slot, a motor for rotating said shaft, a clutch between the motor and shaft, means connected with said motor for propelling the vehicle, and a second clutch for engaging and disengaging said means with respect to the motor.

18. The combination of a vehicle with a side wing, a front wing, and means for simultaneously vibrating both of said wings; said means comprising a pivoted lever having an elongated slot, a shaft having a crank entering said slot, a motor for rotating said shaft, a clutch between the motor and shaft, means connected with said motor for propelling the vehicle, a second clutch for engaging and disengaging said means with respect to the motor, a lever connected with said clutches for operating them, a link connected with said lever, an operating-lever connected with said link, and a spring for normally holding said operating-lever in neutral position.

19. The combination of a vehicle with a side wing, a front wing, means for simultaneously vibrating both of said wings; said means comprising a pivoted lever having an elongated slot, a shaft having a crank entering said slot, a motor for rotating said shaft, a clutch between the motor and shaft, means connected with said motor for propelling the vehicle, and a second clutch for engaging and disengaging said means with respect to the motor; a blower mounted on the vehicle, a battery for operating the motor and the blower, and means for connecting either the blower or motor with the battery.

20. A vehicle comprising a frame, a motor mounted thereon, connections from the motor for propelling the vehicle, a blower on the frame, means for driving the blower and motor, a pair of tubes connected with the outlet of said blower, and a discharge-outlet for each tube directed toward the center of the vehicle.

21. A vehicle comprising a frame having a roof and uprights connected therewith, a blower mounted on the frame, and tubes connected with the blower and with the uprights and having outlets located under the roof.

22. A vehicle comprising a frame, a motor mounted thereon, connections from the motor for propelling the vehicle, a blower on the frame, means for driving the blower and motor, a pair of tubes connected with the outlet of said blower, a discharge-outlet for each tube directed toward the center of the vehicle, wings mounted upon the frame, and means for operating the wings.

23. A vehicle comprising a frame having a roof, trolley-wheels rotatably mounted thereabove from which the vehicle may be suspended, uprights connecting the roof with the body of the vehicle, and means upon the vehicle for propelling it along a track or the like below it.

24. The combination with a vehicle having overhead trolley-wheels, of a track located above the vehicle and adapted to support it, and a guide located adjacent to the track for causing the wheels to engage the track.

25. The combination with a vehicle having overhead trolley-wheels, of a track located above the vehicle and adapted to support it, and a guide located adjacent to the track for causing the wheels to engage the track; said track being pivoted at one end and movably mounted at the other.

26. The combination of a winged vehicle and a trolley-rail from which it may be suspended, and means for bodily lowering the rail with the vehicle suspended therefrom.

27. The combination of a winged vehicle, with a trolley-rail for supporting the vehicle, means for pivotally supporting the trolley-rail at one end, means for movably supporting it at the other, trolley-wheels on the vehicle, and a guide near the pivoted end of the rail for directing the wheels to the rail.

28. The combination of a stationary track, a movable trolley-rail suspended with one end thereabove, a second stationary track located at a distance from the first and at a different elevation, and a vehicle adapted to be supported by said tracks suspended from said rail and moved upon said rail from one track to the other.

29. The combination of a stationary track, a trolley-rail having one end pivoted at a stationary point thereabove, a second stationary track, means for moving the other end of said rail, and a vehicle adapted to run on and above said tracks and to be transferred from one stationary track to the other by said rail.

30. The combination of a stationary track, a trolley-rail having one end pivoted thereabove, a second stationary track located in a lower plane than the first track, means for moving the other end of said rail, a vehicle adapted to be transferred from the first stationary track to the other by said rail, and vertically-movable scenery located between said stationary tracks.

31. The combination with two stationary tracks at different elevations, of a vehicle, movable means for moving the vehicle from the higher track to the lower one, and vertically-movable scenery located between the tracks.

32. The combination with two stationary tracks at different elevations, of a vehicle, and movable means for moving the vehicle from the higher track to the lower one, said means comprising a trolley-rail having two portions at an angle to each other.

33. The combination with a road-bed, of a vehicle adapted to run on the road-bed, and means for moving the vehicle from the road-bed, suspending it in the air out of contact with the road-bed, and depositing it on the road-bed in a different position, said means comprising a movable trolley-rail.

34. A theatrical appliance, comprising a vehicle having a pivoted body and means for swinging the body, comprising a bell-crank on the body and a link pivotally connected with the body and with the stationary part of the vehicle.

35. A theatrical appliance comprising a vehicle having a body pivoted on a horizontal axis, and manually-operable means for swinging said body in a vertical plane.

36. A theatrical appliance comprising a vehicle having a pivoted body, resilient means for supporting said body in horizontal position, and means for swinging the body out of horizontal position.

37. A theatrical appliance comprising a vehicle having a pivoted body, resilient means for supporting said body in horizontal position, and means for swinging the body out of horizontal position; said last-named means comprising a bell-crank on the body, and a link pivotally connected with the body and with a stationary part of the vehicle.

38. A roller-coasting or similar device comprising a plurality of tracks separated by a gap and having their adjacent ends in longitudinal alinement, a second track in a single and approximately horizontal plane and extending above and in line with said first-named tracks, and a car having a plurality of wheels below its body for engaging with said first-named tracks and a plurality of supports extending above its body, each of said supports carrying a wheel for engaging said last-named tracks.

39. A roller-coasting or similar device comprising a plurality of tracks separated by a gap and having their adjacent ends in longitudinal alinement, a second track extending above and in ·line with said first-named tracks, and a car having a plurality of wheels below its body for engaging with said first-named tracks and a plurality of supports rigidly secured to and extending above its body, each of said supports carrying a wheel for engaging said last-named tracks.

40. A roller-coasting or similar device comprising a plurality of tracks separated by a gap and having their adjacent ends in longitudinal alinement, the end of the track leading from the starting-point of the car being in a different horizontal plane than the adjacent end of the track leading to the destination of the car, a second track above and in line with said first-named tracks and forming a bridge for the gap between said tracks, and a car having a plurality of wheels below its body for engaging with said first-named tracks and a plurality of supports extending above its body and carrying wheels for engaging said last-named tracks.

41. A roller-coasting or similar device comprising a plurality of lower tracks separated by a gap, and a second overhead track bridging said gap, in combination with a car having a plurality of wheels below its body for engaging with said first-named tracks, and a plurality of supports extending above its body, each of said supports carrying a wheel for engaging said overhead tracks.

In testimony whereof I have signed my name to this specification in the presence of two subscribing witnesses.

HARRY M. PETTIT.

Witnesses:
JNO. M. RITTER.
ALBERT E. FAY.